(12) United States Patent
Ishikawa

(10) Patent No.: US 12,497,199 B2
(45) Date of Patent: Dec. 16, 2025

(54) FLYING APPARATUS

(71) Applicant: ISHIKAWA ENERGY RESEARCH CO., LTD., Ota (JP)

(72) Inventor: Mitsuru Ishikawa, Ota (JP)

(73) Assignee: ISHIKAWA ENERGY RESEARCH CO., LTD., Ota (JP)

( * ) Notice: Subject to any disclaimer, the term of this patent is extended or adjusted under 35 U.S.C. 154(b) by 0 days.

(21) Appl. No.: 18/857,760

(22) PCT Filed: May 18, 2023

(86) PCT No.: PCT/JP2023/018568
§ 371 (c)(1),
(2) Date: Oct. 17, 2024

(87) PCT Pub. No.: WO2023/224090
PCT Pub. Date: Nov. 23, 2023

(65) Prior Publication Data
US 2025/0108942 A1   Apr. 3, 2025

(30) Foreign Application Priority Data

May 20, 2022 (JP) ................................ 2022-083043
Jul. 29, 2022 (JP) ................................ 2022-121948

(51) Int. Cl.
*B64U 50/30* (2023.01)
*B64U 10/14* (2023.01)
(Continued)

(52) U.S. Cl.
CPC ............. *B64U 50/30* (2023.01); *B64U 10/14* (2023.01); *B64U 20/83* (2023.01); *B64U 20/90* (2023.01)

(58) Field of Classification Search
CPC ........ B64U 10/13; B64U 10/14; B64U 10/16; B64U 20/80; B64U 20/83; B64U 20/90;
(Continued)

(56) References Cited

U.S. PATENT DOCUMENTS 10,124,890 B2 * 11/2018 Sada-Salinas ...... B64C 29/0025
12,166,371 B2 * 12/2024 Eto ...................... B64D 27/357
(Continued)

FOREIGN PATENT DOCUMENTS

CN          106379513 A    2/2017
JP          2018-122674 A  8/2018
(Continued)

OTHER PUBLICATIONS

Office Action dated Jun. 14, 2022, issued in counterpart JP Application No. 2022-083043. (3 pages).
(Continued)

*Primary Examiner* — Joshua E Rodden
(74) *Attorney, Agent, or Firm* — WHDA, LLP

(57) ABSTRACT

A flying apparatus 10 includes an airframe base 14; a power supply unit; an arm 11 which extends from the airframe base 14 toward a periphery; a rotor 12 which is disposed on an end portion side of the arm 11; a motor 17 which rotationally drives the rotor 12; and a power converting unit 19 which converts electric power supplied from the power supply unit to the motor 17. The power converting unit 19 is included inside the arm 11 below a rotation range 24 of the rotor 12. The power converting unit 19 can be effectively cooled by downwash generated by the rotation of the rotor 12.

17 Claims, 9 Drawing Sheets

(51) Int. Cl.
_B64U 20/83_ (2023.01)
_B64U 20/90_ (2023.01)

(58) Field of Classification Search
CPC ........ B64U 50/19; B64U 50/30; B64U 50/31; B64U 50/32; B64U 50/33; B64C 27/68; H02M 7/00; H02M 7/42; H02K 7/14; H02K 11/33
USPC .......................................................... 244/62
See application file for complete search history.

(56) References Cited

U.S. PATENT DOCUMENTS

| | | | | |
|---|---|---|---|---|
| 2014/0131510 | A1* | 5/2014 | Wang | B64D 31/14 244/17.23 |
| 2018/0273194 | A1* | 9/2018 | Edgar | B64U 50/32 |
| 2018/0346136 | A1 | 12/2018 | Arkus et al. | |
| 2019/0092459 | A1* | 3/2019 | Oberndorfer | B64U 30/20 |
| 2020/0307814 | A1* | 10/2020 | Peng | F16B 7/0486 |
| 2021/0139154 | A1* | 5/2021 | Klonowski | B64D 35/024 |
| 2021/0373579 | A1 | 12/2021 | Lukaczyk et al. | |
| 2022/0315237 | A1* | 10/2022 | Fukuchi | B64U 50/19 |
| 2022/0388635 | A1* | 12/2022 | Ishikawa | B64C 25/26 |
| 2023/0227185 | A1* | 7/2023 | Nysæter | B64U 20/83 244/119 |

FOREIGN PATENT DOCUMENTS

| | | |
|---|---|---|
| WO | 2021/220490 A1 | 11/2021 |
| WO | 2021/220491 A1 | 11/2021 |

OTHER PUBLICATIONS

Office Action dated Aug. 23, 2022, issued in counterpart JP Application No. 2022-121948, with English translation. (11 pages).

International Search Report dated Jul. 25, 2023, issued in counterpart Application No. PCT/JP2023/018568, with English translation. (7 pages).

Written Opinion of the International Searching Authority (Form PCT/ISA/237) dated Jul. 25, 2023, issued in counterpart International Application No. PCT/JP2023/018568. (5 pages).

* cited by examiner

FLYING APPARATUS

TECHNICAL FIELD

The present invention relates to a flying apparatus, and particularly relates to a flying apparatus including an airframe base which has a reduced weight and an increased rigidity.

BACKGROUND ART

A flying apparatus capable of flying in the air in an unmanned manner has been conventionally known. Such a flying apparatus is capable of flying in the air by using thrust of a rotor which is rotationally driven about a vertical axis.

As the fields to which flying apparatuses are applied, for example, a transportation field, a survey field, and an imaging field, and the like are considered. In the case of applying a flying apparatus to such a field, the flying apparatus is equipped with a survey device or an imaging device. By applying a flying apparatus to such fields, it becomes possible to fly the flying apparatus to regions where humans cannot enter and to conduct transportation, imaging, and survey in such regions. An invention about such a flying apparatus is described in, for example, Patent Literature 1.

With reference to Patent Literature 1, an airframe is equipped with a plurality of arm portions, and a motor and rotary blades are provided on an outer end portion of each arm portion. In addition, this flying apparatus includes the airframe base disposed in a center portion, and the arms extend from this airframe base to the periphery, and the motors and rotors are disposed on the front end portions of the arms.

CITATION LIST

Patent Literature

Patent Literature 1: Japanese Patent Application Publication No. 2018-122674

SUMMARY OF INVENTION

Technical Problem

However, in the flying apparatus described in the above-described literature, there has been room for improvement from the viewpoint of effectively cooling a constituent device.

That is, a flying apparatus includes a power converting unit for converting a frequency and a voltage of an electric power supplied from a power supply. During the flight of the flying apparatus, a large thermal energy is generated from the power converting unit, but it is not easy to effectively cool the power converting unit. In the case where the cooling of the power converting unit is insufficient, there is a possibility that the power converting unit is brought into an overheated state and frequency conversion by the power converting unit cannot be effectively conducted.

The present invention has been made in view of the above-described circumstances, and an object thereof is to provide a flying apparatus capable of effectively cooling a constituent device.

Solution to Problem

A flying apparatus of the present invention comprises: an airframe base; a power supply unit; an arm which extends from the airframe base toward a periphery; a rotor which is disposed on an end portion side of the arm; a motor which rotationally drives the rotor; and a power converting unit which converts electric power supplied from the power supply unit to the motor, wherein the power converting unit is included inside the arm below a rotation range of the rotor.

In addition, in the flying apparatus of the present invention, the arm includes an internal space which extends along an axial direction, and the power converting unit is housed in the internal space.

In addition, in the flying apparatus of the present invention, the arm has a substantially tubular shape which extends toward the periphery, the power converting unit is in contact with an inner surface of the arm, and a portion with which the power converting unit is in contact in the inner surface of the arm is a flat surface.

In addition, in the flying apparatus of the present invention, the power supply unit includes a power generator which generates an alternating-current power, and the power converting unit includes: a converter unit which converts the alternating-current power to a direct-current power; and an inverter unit which converts the direct-current power to the alternating-current power having a predetermined frequency.

In addition, in the flying apparatus of the present invention, a portion of the arm with which the power converting unit is in contact is thicker than the other portion of the arm.

In addition, in the flying apparatus of the present invention, the arm includes an upper thin portion, a lower thin portion, and a thick portion provided between the upper thin portion and the lower thin portion, and the power converting unit is disposed to be in contact with an inner surface of the thick portion.

In addition, the flying apparatus of the present invention further comprises a lower protruding portion which is formed by causing a lower end side of the arm to continuously protrude upward.

In addition, the flying apparatus of the present invention further comprises an upper protruding portion which is formed by causing an upper end side of the arm to continuously protrude downward.

In addition, in the flying apparatus of the present invention, a distance between an outer end portion of the power converting unit and a portion in which the airframe base is connected to the arm is ⅔ or less of a length of the arm.

In addition, in the flying apparatus of the present invention, the rotor includes an upper rotor and a lower rotor, the power converting units are provided to correspond to the upper rotor and the lower rotor, and all the power converting units are incorporated in the arm.

In addition, in the flying apparatus of the present invention, the power converting units are disposed away from each other below the rotation range of the rotor.

In addition, in the flying apparatus of the present invention, the arm is formed of an extruded or pultruded metal.

In addition, a flying apparatus of the present invention comprises: an airframe base; a power supply unit; an arm which extends from the airframe base toward a periphery and which has a substantially tubular shape; a rotor which is disposed on an end portion side of the arm; a motor which rotationally drives the rotor; and a power converting unit which converts electric power supplied from the power supply unit to the motor, wherein the power converting unit is included inside the arm below a rotation range of the rotor, the arm includes: an upper thin portion which is an upper portion of the substantially tubular shape; a lower thin portion which is a lower portion of the substantially tubular shape; and a thick portion which is provided between the upper thin portion and the lower thin portion, which is formed to be flatter than the upper thin portion and the lower thin portion, and which is thicker than the upper thin portion and the lower thin portion, and the power converting unit is disposed inside the arm to be in surface-contact with an inner surface of the thick portion.

Advantageous Effects of Invention

The flying apparatus of the present invention comprises: an airframe base; a power supply unit; an arm which extends from the airframe base toward a periphery; a rotor which is disposed on an end portion side of the arm; a motor which rotationally drives the rotor; and a power converting unit which converts electric power supplied from the power supply unit to the motor, wherein the power converting unit is included inside the arm below a rotation range of the rotor. According to the flying apparatus of the present invention, since the power converting unit is disposed below the rotation range of the rotor, the power converting unit can be effectively cooled by downwash generated by the rotation of the rotor. Moreover, since the power converting unit is included inside the arm, heat generated from the power converting unit can be effectively dissipated via the arm. Hence, it is possible to prevent overheating of the power converting unit during the flight and keep the number of revolutions of the rotor at a predetermined speed.

In addition, in the flying apparatus of the present invention, the arm includes an internal space which extends along an axial direction, and the power converting unit is housed in the internal space. According to the flying apparatus of the present invention, heat can be more effectively dissipated via the arm by housing the power converting unit in the internal space of the arm.

In addition, in the flying apparatus of the present invention, the arm has a substantially tubular shape which extends toward the periphery, the power converting unit is in contact with an inner surface of the arm, and a portion with which the power converting unit is in contact in the inner surface of the arm is a flat surface. According to the flying apparatus of the present invention, as the power converting unit is in surface-contact with the inner surface of the arm, the heat can be more effectively transmitted from the power converting unit to the arm, so that the power converting unit can be cooled.

In addition, in the flying apparatus of the present invention, the power supply unit includes a power generator which generates an alternating-current power, and the power converting unit includes: a converter unit which converts the alternating-current power to a direct-current power; and an inverter unit which converts the direct-current power to the alternating-current power having a predetermined frequency. According to the flying apparatus of the present invention, since the power converting unit includes the converter unit and the inverter unit, the heat generated from the power converting unit increases; however, the overheating of the power converting unit can be prevented by effectively dissipating the heat via the arm.

In addition, in the flying apparatus of the present invention, a portion of the arm with which the power converting unit is in contact is thicker than the other portion of the arm. According to the flying apparatus of the present invention, since the portion of the arm which is in contact with the power converting unit is thicker, the arm functions like a heat sink, and can suppress an increase in temperature of the power converting unit.

In addition, in the flying apparatus of the present invention, the arm includes an upper thin portion, a lower thin portion, and a thick portion provided between the upper thin portion and the lower thin portion, and the power converting unit is disposed to be in contact with an inner surface of the thick portion. According to the flying apparatus of the present invention, having the upper thin portion and the lower thin portion makes it possible to achieve a reduction in weight of the arm, and by bringing the power converting unit into contact with the thick portion, the power converting unit can be effectively cooled.

In addition, the flying apparatus of the present invention further comprises a lower protruding portion which is formed by causing a lower end side of the arm to continuously protrude upward. According to the flying apparatus of the present invention, the rigidity of the arm can be enhanced by the lower protruding portion.

In addition, the flying apparatus of the present invention further comprises an upper protruding portion which is formed by causing an upper end side of the arm to continuously protrude downward. According to the flying apparatus of the present invention, the rigidity of the arm can be enhanced by the upper protruding portion.

In addition, in the flying apparatus of the present invention, a distance between an outer end portion of the power converting unit and a portion in which the airframe base is connected to the arm is ⅔ or less of a length of the arm. According to the flying apparatus of the present invention, the power converting unit can be disposed close to the airframe base, and in the case where the posture of the flying apparatus changes during the flight, moment generated due to the power converting unit can be reduced.

In addition, in the flying apparatus of the present invention, the rotor includes an upper rotor and a lower rotor, the power converting units are provided to correspond to the upper rotor and the lower rotor, and all the power converting units are incorporated in the arm. According to the flying apparatus of the present invention, all the power converting units can be effectively cooled by incorporating the power converting units provided to correspond respectively to the plurality of rotors in the arm.

In addition, in the flying apparatus of the present invention, the power converting units are disposed away from each other below the rotation range of the rotor. According to the flying apparatus of the present invention, the power converting units can be further effectively cooled by disposing the power converting units away from each other.

In addition, in the flying apparatus of the present invention, the arm is formed of an extruded or pultruded metal. According to the flying apparatus of the present invention, the arm can be formed of a seamless metal material, so that the strength of the arm can be improved, and further, the airtightness is improved, so that the entering of water into the inside can be suppressed.

In addition, a flying apparatus of the present invention comprises: an airframe base; a power supply unit; an arm which extends from the airframe base toward a periphery and which has a substantially tubular shape; a rotor which is disposed on an end portion side of the arm; a motor which rotationally drives the rotor; and a power converting unit which converts electric power supplied from the power supply unit to the motor, wherein the power converting unit is included inside the arm below a rotation range of the rotor, the arm includes: an upper thin portion which is an upper portion of the substantially tubular shape; a lower thin portion which is a lower portion of the substantially tubular shape; and a thick portion which is provided between the upper thin portion and the lower thin portion, which is formed to be flatter than the upper thin portion and the lower thin portion, and which is thicker than the upper thin portion and the lower thin portion, and the power converting unit is disposed inside the arm to be in surface-contact with an inner surface of the thick portion. With this, first, the upper thin portion and the lower thin portion are thinner, so that the amount of magnesium used in the arm can be reduced. Hence, the weight of the arm, in turn, the weight of the entire flying apparatus can be reduced. In addition, the flying apparatus can also be manufactured at low cost by reducing the amount of expensive magnesium used. Moreover, the thick portion functions like a heat sink. That is, in the flight state of the flying apparatus, even in the case where the amount of heat generated from the power converting unit is large, the heat emitted from the power converting unit is favorably dissipated to the atmosphere after the area of heat generation is expanded by the thick portion. In addition, under the flight state of the flying apparatus, flight air always hits the arm, the heat dissipation via the thick portion is further favorably conducted. Hence, overheating of the power converting unit during the flight of the flying apparatus is suppressed, so that the flying apparatus can continue flying stably. The heat transfer from the power converting unit to the thick portion is very favorably conducted. Such configuration can make significant the effect of preventing overheating of the power converting unit during the flight of the flying apparatus.

DESCRIPTION OF EMBODIMENTS

Hereinafter, a flying apparatus 10 according to the present embodiment will be described with reference to the drawings. In the following description, the same members are denoted by the same reference signs in principle, and repetitive description will be omitted. In addition, in the following description, upper, lower, front, rear, left, and right directions are used, where the left and right directions are left and right directions in the case where the flying apparatus 10 is viewed from the rear side in FIG. 1.

Figure 1:
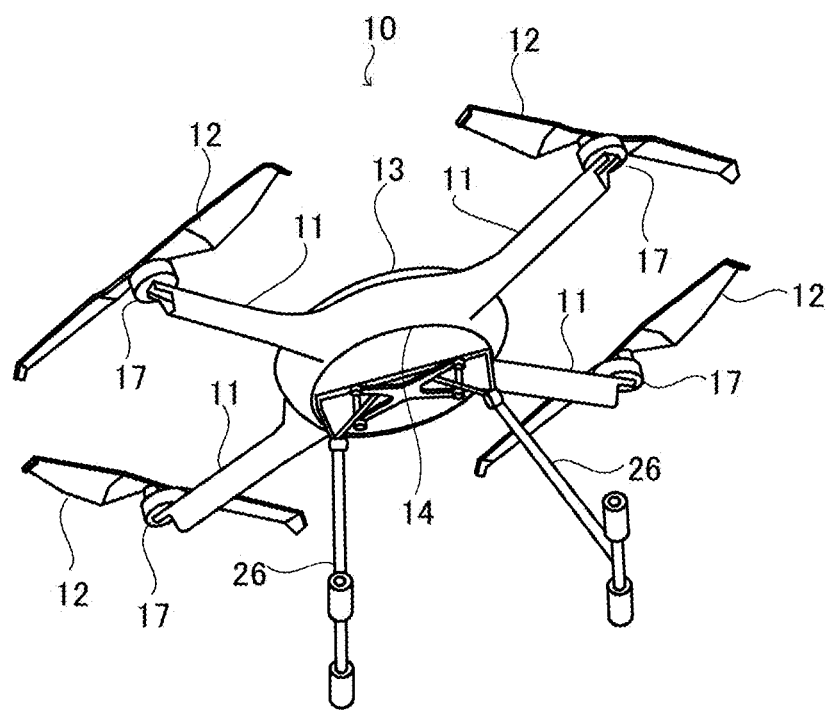
FIG. 1 is a perspective view showing a flying apparatus according to an embodiment of the present invention.
Figure 1:
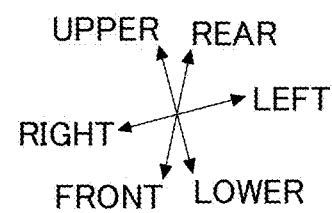

FIG. 1 is a perspective view showing the flying apparatus 10.

Figure 2:
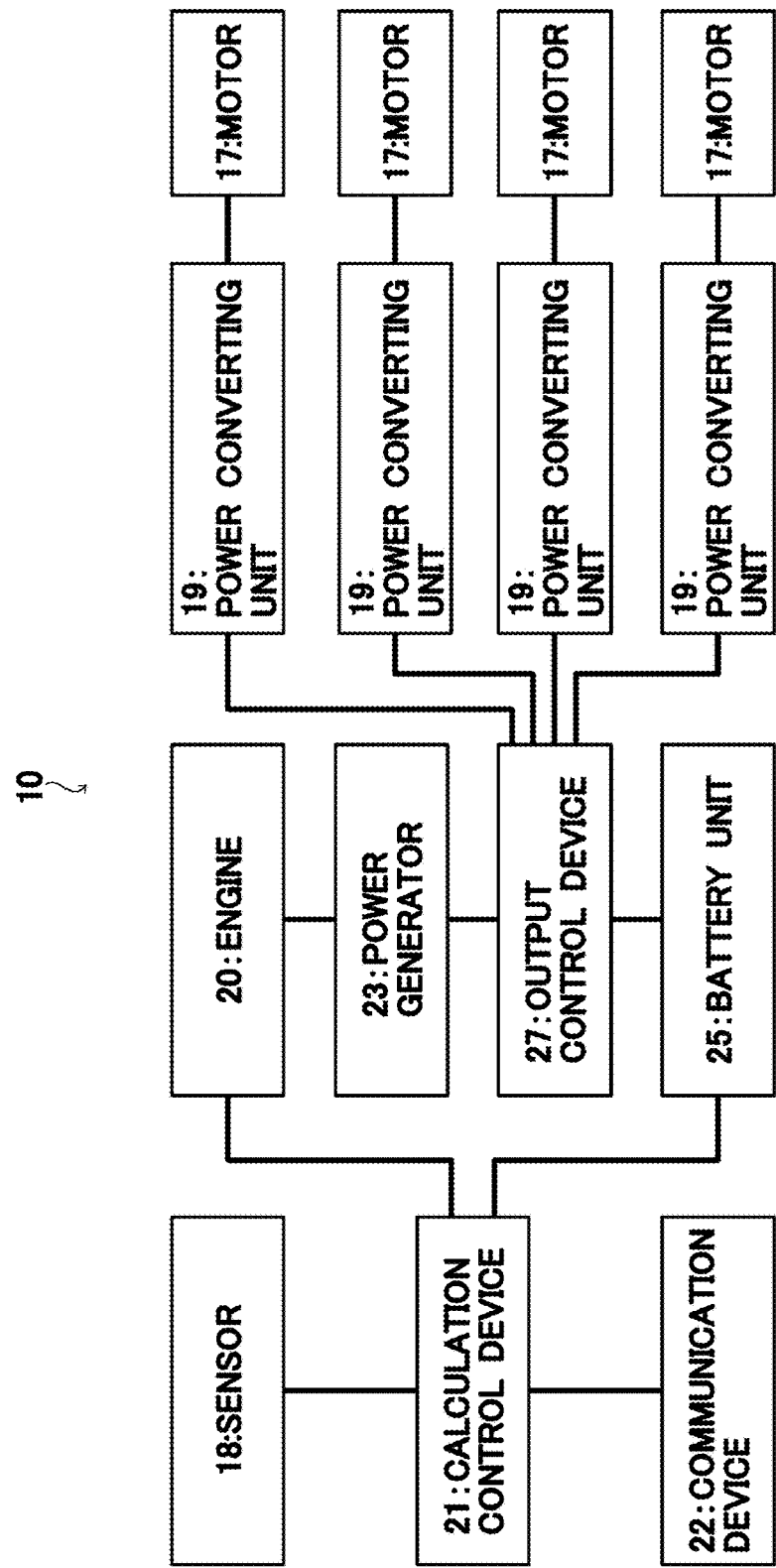
FIG. 2 is a block diagram showing a connection configuration of the flying apparatus according to the embodiment of the present invention.

With reference to FIG. 1, the flying apparatus 10 mainly includes an airframe base 14, a power supply unit, which is not shown here, arms 11 which extends from the airframe base 14 to a periphery, rotors 12 which are disposed on end portion sides of the arms 11, motors 17 which rotationally drive the rotors 12, and power converting units 19 which convert electric power supplied from the power supply unit to the motors 17 (see FIG. 2).

The flying apparatus 10 may be an electric drone, a series hybrid drone, or a parallel hybrid drone. In an electric drone, the motors 17 are rotated by electric power fed from a battery. In a series hybrid drone, the motors 17 are rotationally driven by electric power generated by a drive force of an engine. In a parallel hybrid drone, some of the motors 17 and the rotors 12 are rotationally driven by electric power generated by a drive force of an engine, and the other rotors 12 are mechanically rotated by the drive force of the engine. In either case, the power converting units 19, which will be described later, generate heat during operation, and are cooled by downwash generated by the rotation of the rotors 12.

The airframe base 14 is disposed in the center of the flying apparatus 10, and houses an engine, a battery, a power generator, a control device, various sensors, a fuel tank, and the like, which are not shown here. In addition, the upper opening of the airframe base 14 is covered with a lid portion 13.

In a lower portion of the airframe base 14, leg portions 26, which come into contact with the ground in landing, are disposed.

FIG. 2 is a block diagram showing a connection configuration of the flying apparatus 10. The flying apparatus 10 includes a calculation control device 21, a sensor 18, a communication device 22, an engine 20, a power generator 23, a battery unit 25, an output control device 27, the power converting units 19, the motors 17, and the like.

Here, a so-called series hybrid flying apparatus 10 is shown as an example in which the power generator 23 is driven to generate electric power by the drive force of the engine 20, and the motors 17 are rotated by the electric power generated by this power generator 23 to rotate the above-described rotors 12.

The sensor 18 senses the conditions of the flying apparatus 10 and the periphery thereof. Specifically, as the sensor 18, one or a plurality of sensors are employed from among a gyroscope sensor which measures the angle at which the flying apparatus 10 is tilted, a compass which measures the direction of the flying apparatus 10, a GPS sensor (Global Positioning System) which measures the position of the flying apparatus 10, an atmospheric pressure sensor which measures the altitude of the flying apparatus 10, and an acceleration sensor which measures the speed of movement and the like of the flying apparatus 10. Information indicating each physical amount measured by the sensor 18 is transmitted to the calculation control device 21.

The communication device 22 is capable of transmitting and receiving information to and from a ground communication device, which is possessed by an operator who operates the flying apparatus 10 on the ground and which is not shown. By operating the ground communication device, the operator can operate the altitude, direction of movement, speed of movement, and the like of the flying apparatus 10. In addition, by receiving information transmitted from the communication device 22 with the ground communication device, which is not shown, the operator can obtain measurement data and image data obtained by the flying apparatus 10.

The calculation control device 21 includes a calculation device composed of a CPU (Central Processing Unit) and a storage device composed of a RAM (Random Access Memory) and a ROM (Read Only Memory), and controls the movement of the entire flying apparatus 10. That is, the calculation control device 21 controls the operations of the output control device 27 and each power converting unit 19 to obtain a predetermined position and posture of the flying apparatus 10 in the air based on information inputted from the sensor 18 and the communication device 22.

The engine 20 is an internal combustion engine which is driven based on an instruction from the calculation control device 21. As the engine 20, an opposed engine can be employed, for example.

The power generator 23 is a device which generates electric power by using the drive force of the engine 20. The alternating-current power generated by the power generator 23 is supplied to each power converting unit 19 via the output control device 27.

The battery unit 25 is a rechargeable secondary battery, for example, and is a lithium-ion battery as an example.

Here, the power generator 23 is an example of the power supply unit.

The output control device 27 supplies electric power from the power generator 23 or the battery unit 25 to the power converting units 19 based on an instruction from the calculation control device 21. Here, a converter 29, which will be described later, is interposed between the output control device 27 and the power converting units 19. Hence, the alternating-current power generated by the power generator 23 is converted to direct-current power by the converter 29, which will be described later, and this direct-current power is converted to alternating-current power having a predetermined frequency by each power converting unit 19, and this alternating-current power is supplied to each motor 17. This causes each rotor 12 mentioned above to rotate at a predetermined rotation speed.

The power converting unit 19 is a device which converts the electric power supplied from the output control device 27 to electric power having a predetermined frequency suitable for rotational drive of the motors 17. For example, in the case where the alternating-current power from the power generator 23 is inputted to the power converting unit 19, the power converting unit 19 includes: a converter unit which converts the alternating-current power to a direct-current power; and an inverter unit which converts the direct-current power to an alternating-current power having a predetermined frequency. In the present embodiment, the power converting unit 19 is incorporated in the aforementioned arm 11 as described later. In addition, when the power converting unit 19 includes the converter unit and the inverter unit, the heat generated from the power converting unit 19 increases. However, the overheating of the power converting unit 19 can be prevented by effectively dissipating heat via the arm 11.

The operation of the flying apparatus 10 will be briefly described. The flying apparatus 10 is operated in a landing state, a takeoff state, a hovering state, an ascent and descent state, and a horizontal movement state.

In the landing state, the flying apparatus 10 is in contact with the ground. In this state, the engine 20 is not in operation, and the rotors 12 do not rotate.

In the takeoff state, the flying apparatus 10 takes off the ground and ascends mainly by using thrust generated by the rotation of the rotors 12.

In the hovering state, based on an instruction from the calculation control device 21, the flying apparatus 10 drives the power generator 23 by using the drive force generated from the engine 20, converts the electric power supplied from the power generator 23 with the power converting units 19, and the motors 17 rotate the rotors 12 by using the converted electric power to cause the flying apparatus 10 to hover at a certain position in the air. The calculation control device 21 controls each power converting unit 19 to obtain a predetermined rotation speed of each motor 17 and rotor 12 so that the flying apparatus 10 can maintain a predetermined altitude and posture.

In the ascent and descent state, the flying apparatus 10 is caused to ascend or descend by controlling the number of revolutions of each motor 17. In this state as well, the calculation control device 21 controls each power converting unit 19 to obtain a predetermined rotation speed of each motor 17 and rotor 12 so that the flying apparatus 10 can maintain a predetermined altitude and posture.

In the horizontal movement state, the calculation control device 21 controls each power converting unit 19 to control the number of revolutions of each motor 17 and rotor 12 to bring the flying apparatus 10 into a tilted state. In this state as well, the calculation control device 21 controls the drive state of each power converting unit 19 to rotate each rotor 12 at a predetermined speed.

In the present embodiment, as described later, it is possible to stably fly the flying apparatus 10 by preventing the overheating of the power converting units 19 by cooling the power converting units 19 using downwash generated by the rotation of the rotors 12.

Figure 3:
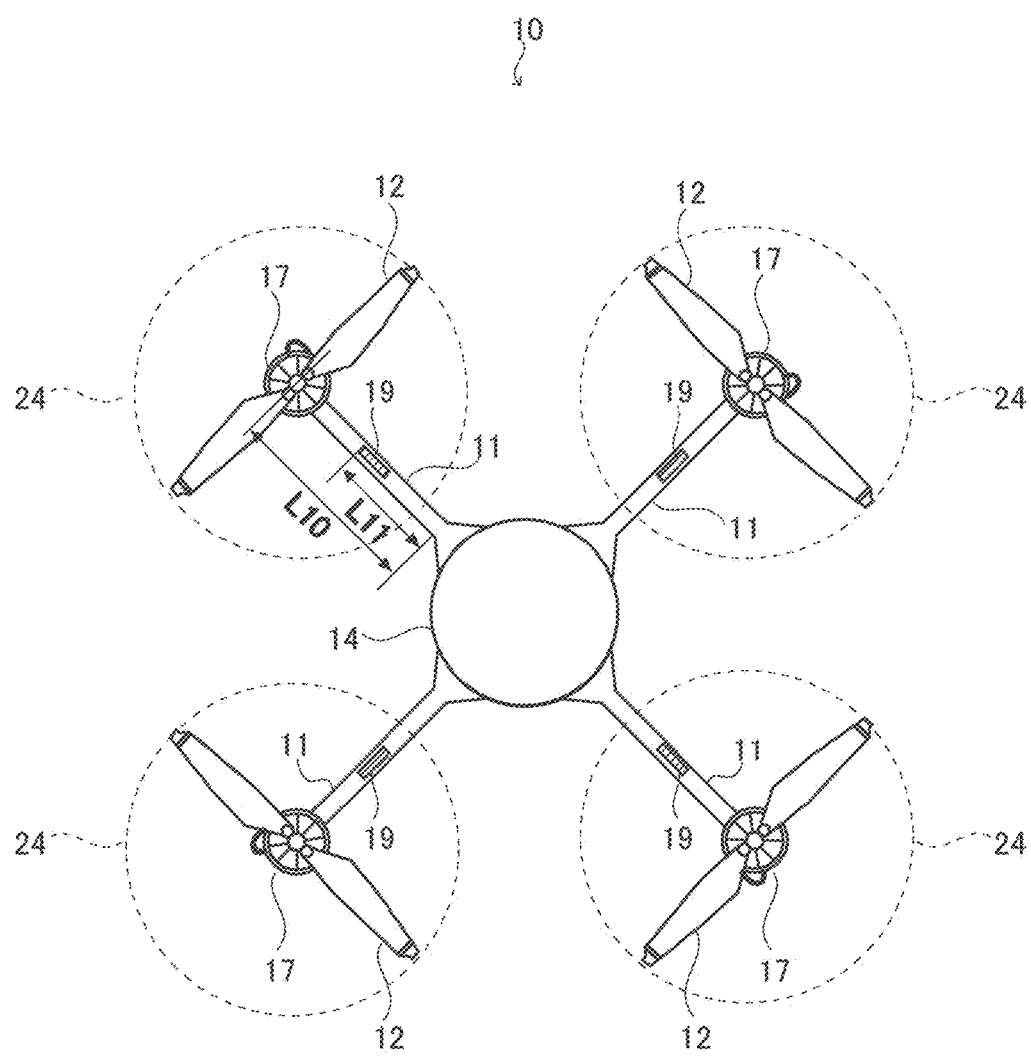
FIG. 3 is a top view showing the flying apparatus according to the embodiment of the present invention.
Figure 3:
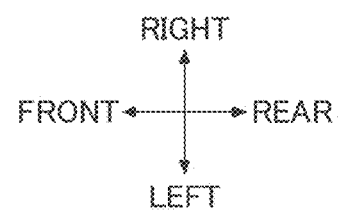

FIG. 3 is a top view of the flying apparatus 10 as viewed from above.

The power converting unit 19 is included in each arm 11 below a rotation range 24 of the rotor 12. Specifically, four arms 11 extend outward from the airframe base 14, and the motor 17 and the rotor 12 are disposed in an outer end portion of each arm 11. In addition, the power converting unit 19 is included in a middle portion of each arm 11. Here, wiring which connects the aforementioned output control device 27, power converting units 19, and motors 17 is routed inside the arms 11.

The outer edges of the rotation ranges 24 of the rotors 12 are indicated by dashed lines. The power converting units 19 are disposed inside the rotation ranges 24. According to the present embodiment, since the power converting units 19 are disposed below the rotation ranges 24 of the rotors 12, the power converting units 19 can be effectively cooled by downwash generated by the rotation of the rotors 12. Moreover, since the power converting units 19 are included in the arms 11, heat generated from the power converting units 19 can be effectively dissipated via the arms 11. Hence, it is possible to prevent overheating of the power converting unit 19 during the flight and keep the numbers of revolutions of the rotors 12 at a predetermined speed.

Here, the power converting units 19 are disposed at positions as close to the airframe base 14 as possible. Specifically, the length of the arm 11 is L10, and the distance from the connection portion between the airframe base 14 and the arm 11 to the outer end portion of the power converting unit 19 is L11. In this case, L11 is set to be ⅔ or less of L10. Moreover, L11 is set to be half or less of L10. Furthermore, L11 is set to be ⅓ or less of L10. This allows the power converting units 19, which are relatively heavy in weight, to be disposed close to the airframe base 14. Hence, even in the case where the posture changes during the flight of the flying apparatus 10, moment generated due to the power converting units 19 can be reduced, so that the position and posture of the flying apparatus 10 can be stabilized.

Figure 4:
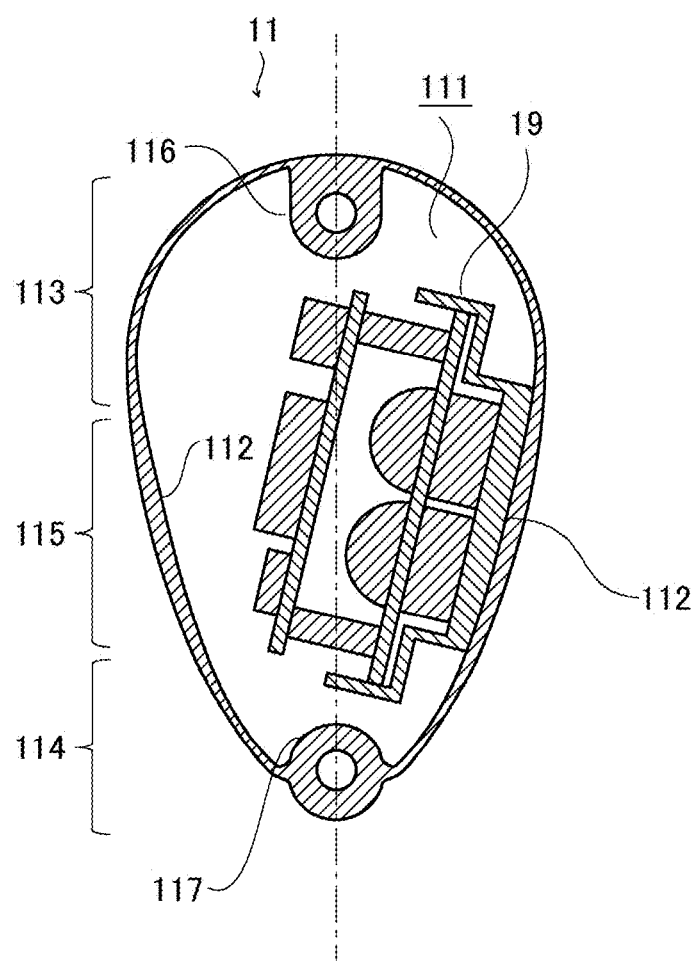
FIG. 4 is a sectional view showing an arm of the flying apparatus according to the embodiment of the present invention.

FIG. 4 is a sectional view obtained by cutting the arm 11 in a portion where the power converting unit 19 is included.

The shape of the arm 11 is described. The arm 11 is a tubular member which has a substantially tubular shape extending from the airframe base 14 shown in FIG. 1 toward the periphery. In addition, the arm 11 is formed of an extruded metal such as magnesium or magnesium alloy. By forming the arm 11 from an extruded member, since there is no seam in the arm 11, the strength of the arm 11 can be improved. In addition, when the arm 11 is formed of magnesium, it is possible to reduce the weight of the arm 11 while securing the strength of the arm 11.

The section of the arm 11 is made a substantially egg shape. Specifically, the arm 11 is made based on an elliptic shape, where the upper portion is wider than the lower portion. By making the sectional shape of the arm 11 such a shape, downwash which flows downward from above can be caused to effectively flow toward the portions where the power converting unit 19 is attached, so that the power converting unit 19 can be actively cooled, during the flight of the flying apparatus 10.

The arm 11 includes an upper thin portion 113, a lower thin portion 114, and a thick portion 115. The upper thin portion 113 is an upper end portion of the arm 11 and is made thin. The lower thin portion 114 is a lower end portion of the arm 11 and is made thin. The thick portion 115 is a portion provided between the upper thin portion 113 and the lower thin portion 114, and is made thicker than the upper thin portion 113 and the lower thin portion 114. The power converting unit 19 is disposed to be in contact with an inner surface of the thick portion 115. Having the upper thin portion 113 and the lower thin portion 114 can achieve a reduction in weight of the arm 11. Moreover, by bringing the power converting unit 19 into contact with the thick portion 115, the thick portion 115 is allowed to function as a heat sink to effectively cool the power converting unit 19.

The arm 11 includes an internal space 111 which extends along an axial direction, and the power converting unit 19 is housed in the internal space 111. This makes it possible to more effectively dissipate the heat via the arm 11. Moreover, the arm 11 is manufactured through extrusion and thus has no seam, which can suppress the entering of water and the like into the inside of the arm 11, and can thus suppress short-circuiting of the power converting unit 19 and the like.

The inner surface of the thick portion 115 of the arm 11 is made to be a flat surface 112. The power converting unit 19 is disposed inside the arm 11 to be in surface-contact with the flat surface 112. Inside the arm 11, the configuration of fixing the power converting unit 19 may be fastening or adhesion. As the power converting unit 19 is in surface-contact with the inner surface of the arm 11, the heat can be more effectively transmitted from the power converting unit 19 to the arm 11, so that the power converting unit 19 can thus be cooled.

The upper protruding portion 116 is a portion formed by causing an upper end side of the inner surface of the arm 11 to continuously protrude downward. The upper protruding portion 116 is a portion which continues integrally with the inner surface of the arm 11. The upper protruding portion 116 is formed continuously from an inner end portion to an outer end portion in a longitudinal direction of the arm 11. In other words, the upper protruding portion 116 is a portion protruding in a substantially bar shape from an upper end of the inside of the arm 11. The rigidity of the arm 11 can be enhanced by the upper protruding portion 116.

The lower protruding portion 117 is a portion formed by causing a lower end side of the inner surface of the arm 11 to continuously protrude upward. The lower protruding portion 117 is a portion which continues integrally with the inner surface of the arm 11. The lower protruding portion 117 is formed continuously from an inner end portion to an outer end portion in the longitudinal direction of the arm 11. In other words, the lower protruding portion 117 is a portion protruding in a substantially bar shape from a lower end of the inside of the arm 11. The rigidity of the arm 11 can be enhanced by the lower protruding portion 117.

Figure 5A:
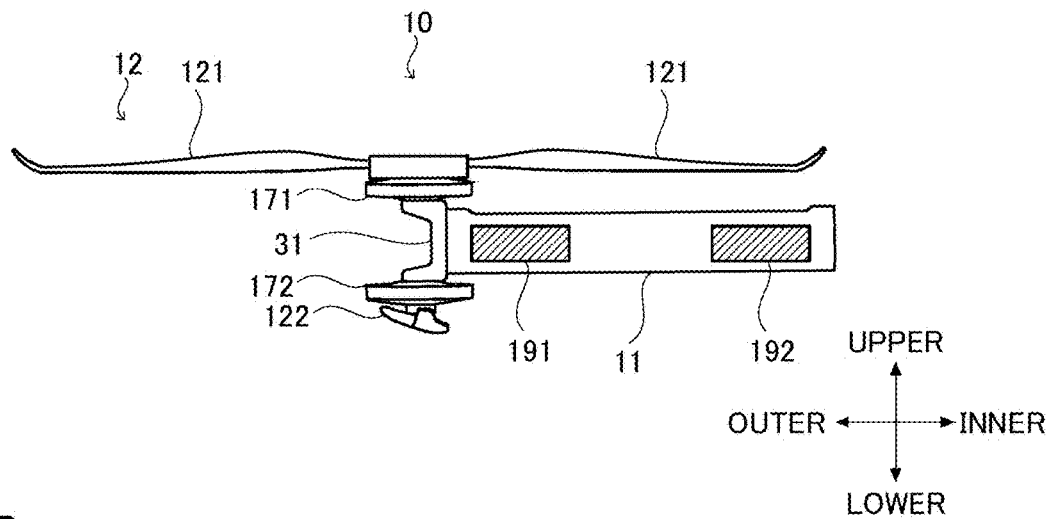
FIG. 5A is a side view showing an arm and a rotor of a flying apparatus according to another embodiment of the present invention.
Figure 5B:
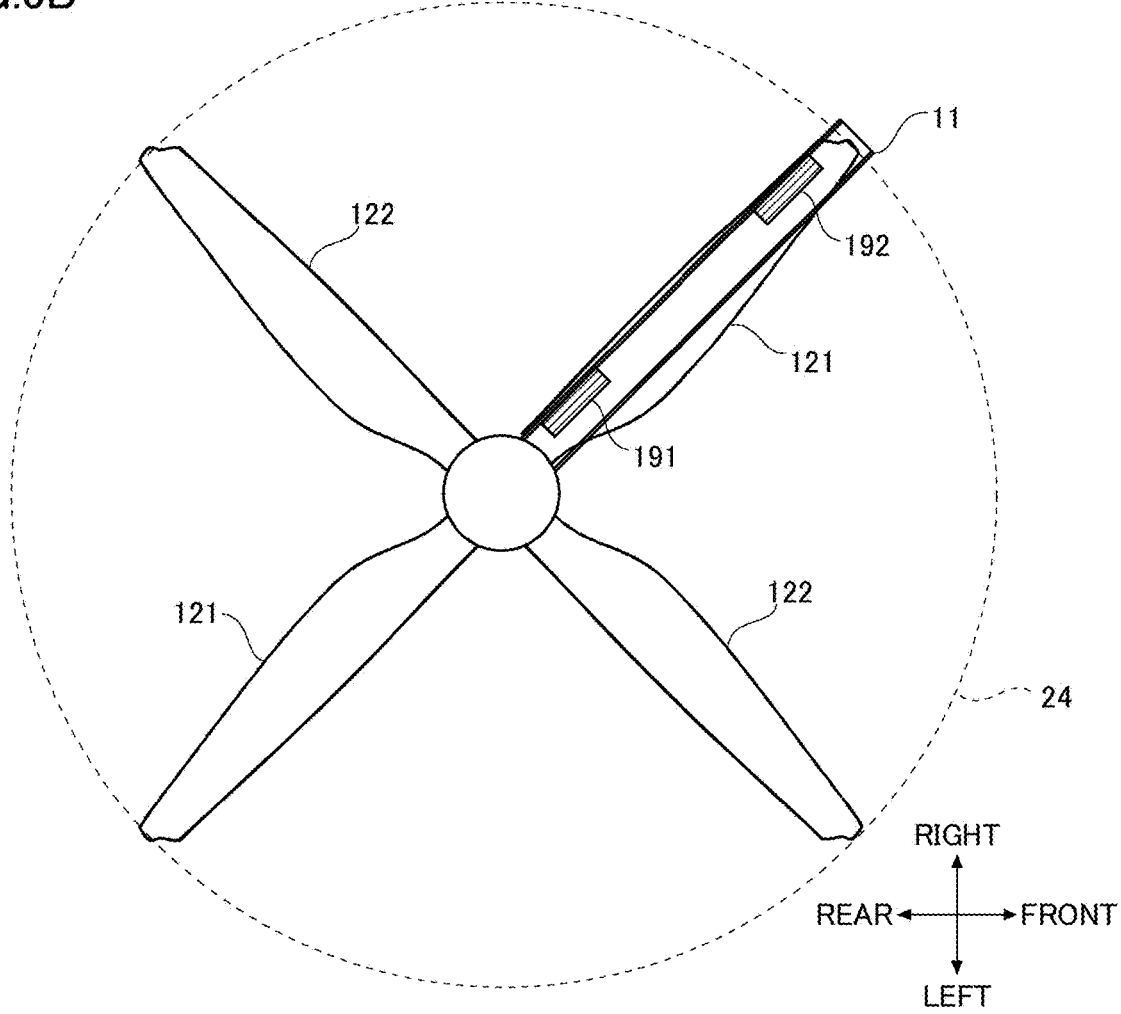
FIG. 5B is a top view showing the arm and the rotor of the flying apparatus according to the other embodiment of the present invention.

With reference to FIG. 5A and FIG. 5B, a configuration of a flying apparatus 10 according to another embodiment will be described. FIG. 5A is a side view showing an arm 11 and a rotor 12 of the flying apparatus 10. FIG. 5B is a top view showing the arm 11 and the rotor 12. The configuration of the flying apparatus 10 shown in FIG. 5A and FIG. 5B is basically the same as that shown in FIG. 1 and the like, and is mainly different in that the flying apparatus 10 includes an upper rotor 121, a lower rotor 122, and the like.

With reference to FIG. 5A and FIG. 5B, the rotor 12 includes the upper rotor 121 and the lower rotor 122. The upper rotor 121 is disposed on the upper side of the arm 11 and is rotated by an upper motor 171. The upper rotor 121 is disposed on the lower side of the arm 11 and is rotated by a lower motor 172. The upper rotor 121 and the lower rotor 122 are disposed to be one on top of the other in the vertical direction, and rotate in opposite directions at the same speed.

Inside the arm 11, a power converting unit 191 and a power converting unit 192 are disposed. The power converting unit 191 includes an inverter circuit which supplies a predetermined alternating-current power to the upper motor 171. The power converting unit 192 includes an inverter circuit which supplies a predetermined alternating-current power to the lower motor 172. To the power converting unit 191 and the power converting unit 192, the direct-current power is supplied from the aforementioned converter.

In addition, an attachment portion 31 is attached to an outer end portion of the arm 11. The upper motor 171 is fixed to an upper end portion of the attachment portion 31. The lower motor 172 is fixed to a lower end portion of the attachment portion 31.

As shown in FIG. 5B, the power converting unit 191 and the power converting unit 192 are disposed inside the rotation range 24 of the upper rotor 121 and the lower rotor 122. This makes it possible to favorably cool the power converting unit 191 and the power converting unit 192 via the arm 11 by using downwash generated by the rotations of the upper rotor 121 and the lower rotor 122.

Figure 6A:
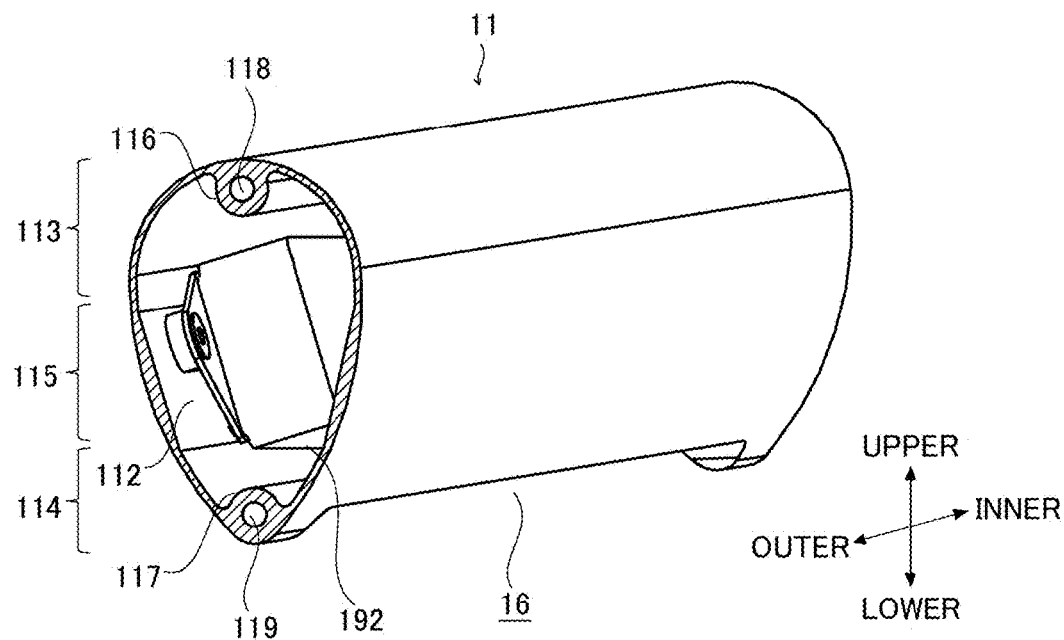
FIG. 6A is a perspective view showing the arm of the flying apparatus according to the other embodiment of the present invention.
Figure 6B:
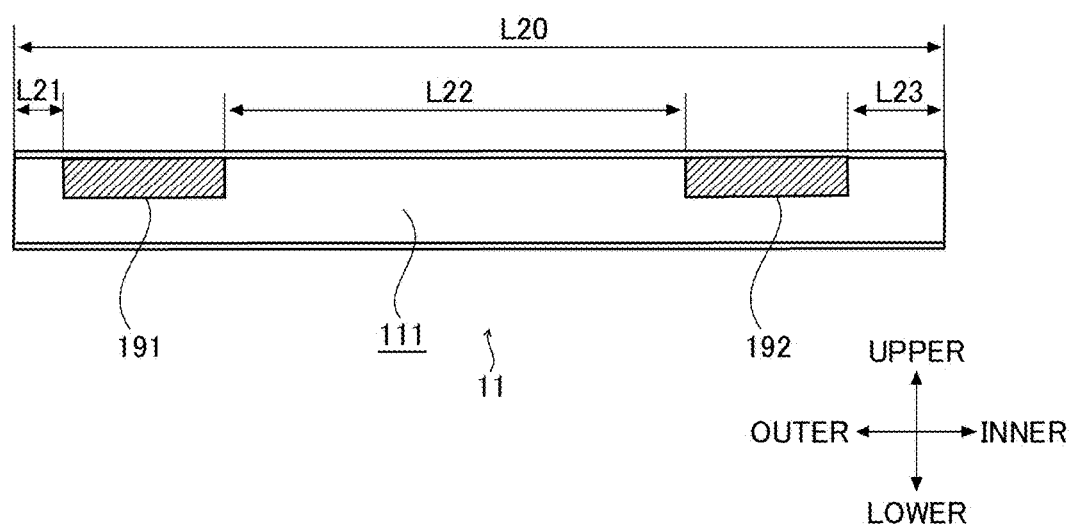
FIG. 6B is a side view showing the arm of the flying apparatus according to the other embodiment of the present invention.

FIG. 6A is a perspective view showing the arm 11. FIG. 6B is a side view showing the arm 11. The basic configuration of the section of the arm 11 is the same as that described with reference to FIG. 4.

With reference to FIG. 6A, the arm 11 is a substantially tubular member having an outer opening formed in an outer end portion and an inner opening formed in an inner end portion. The arm 11 is formed of magnesium, a magnesium alloy, or the like. The arm 11 is formed by extrusion or pultrusion. In this way, the arm 11 can be formed as a seamless integrated member, so that the strength of the arm 11 can be improved. In addition, since the arm 11 has no seam, the inside airtightness is improved, and even when the flying apparatus 10 is flown in the rain, it is possible to prevent water from entering the inside of the arm 11. Hence, it is possible to prevent short-circuiting of the power converting unit 191 and the power converting unit 192 incorporated in the arm 11.

With reference to the opening portion on the front side of the arm 11, an attachment hole 118 is formed in the upper protruding portion 116, and an attachment hole 119 is formed in the lower protruding portion 117. The attachment hole 118 and the attachment hole 119 are portions for fastening the attachment portion 31 shown in FIG. 5A by screwing or the like. Such configuration applies also to the inner opening of the arm 11.

A thinned portion 16 is a portion formed by thinning the lower end portion of the arm 11. The thinned portion 16 is formed continuously across from a vicinity of an outer side to a vicinity of an inner side of the arm 11. By forming the thinned portion 16, it is possible to further reduce the weight while securing the mechanical strength of the arm 11 at a certain level or more.

With reference to FIG. 6B, the power converting unit 191 and the power converting unit 192 are disposed in the internal space 111 of the arm 11 as mentioned above. Here, the entire length of the arm 11 is L20, the distance between the power converting unit 191 and the outer end portion of the arm 11 is L21, the distance between the power converting unit 191 and the power converting unit 192 is L22, and the distance between the power converting unit 192 and the inner end portion of the arm 11 is L23.

In this case, L22 is set to be larger than L21 and L22. This makes it possible to make longer the distance between the power converting unit 191 and the power converting unit 192, and thus to prevent the power converting unit 191 and the power converting unit 192 from thermally interfering with each other during the flight. Moreover, L22 is set to be ⅓ or more of L20, half or more of L20, or ⅔ or more of L20. This makes it possible to further significantly exhibit the effect of preventing the power converting unit 191 and the power converting unit 192 from thermally interfering with each other during the flight.

Figure 7:
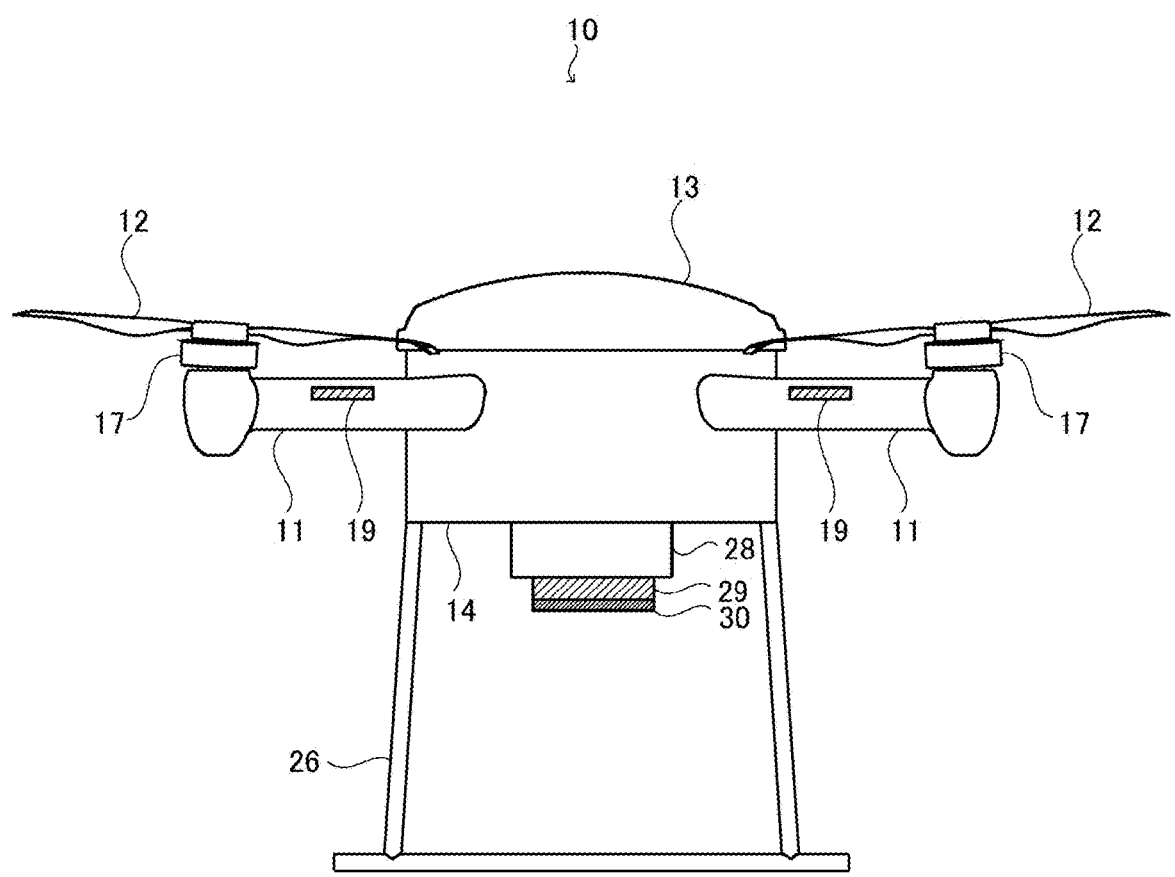
FIG. 7 is a side view showing a flying apparatus according to an embodiment of the present invention.

FIG. 7 is a side view showing a flying apparatus 10 according to another embodiment. A configuration of the flying apparatus 10 shown in FIG. 7 is basically the same as that shown in FIG. 1 and the like, and is mainly different in that the flying apparatus 10 includes a housing unit 28 and a converter 29.

Here, the housing unit 28 and the converter 29 are disposed below the airframe base 14.

The housing unit 28 is a box-shaped portion in which electric components such as a control board and wiring are housed.

The converter 29 is a circuit which converts alternating current generated by the aforementioned power generator 23 to direct current. The direct-current power thus obtained by the conversion of the converter 29 is supplied to the inverter circuit of each power converting unit 19 shown in FIG. 3, for example.

To a lower portion of the converter 29, a heat sink 30 is connected. The heat sink 30 is a portion formed of a metal such as aluminum for actively dissipating heat generated from the converter 29 to the atmosphere. By providing the heat sink 30 below the airframe base 14, it is possible to actively cool the heat sink 30 and the converter 29 by utilizing flight air generated during the flight of the flying apparatus 10.

Figure 8:
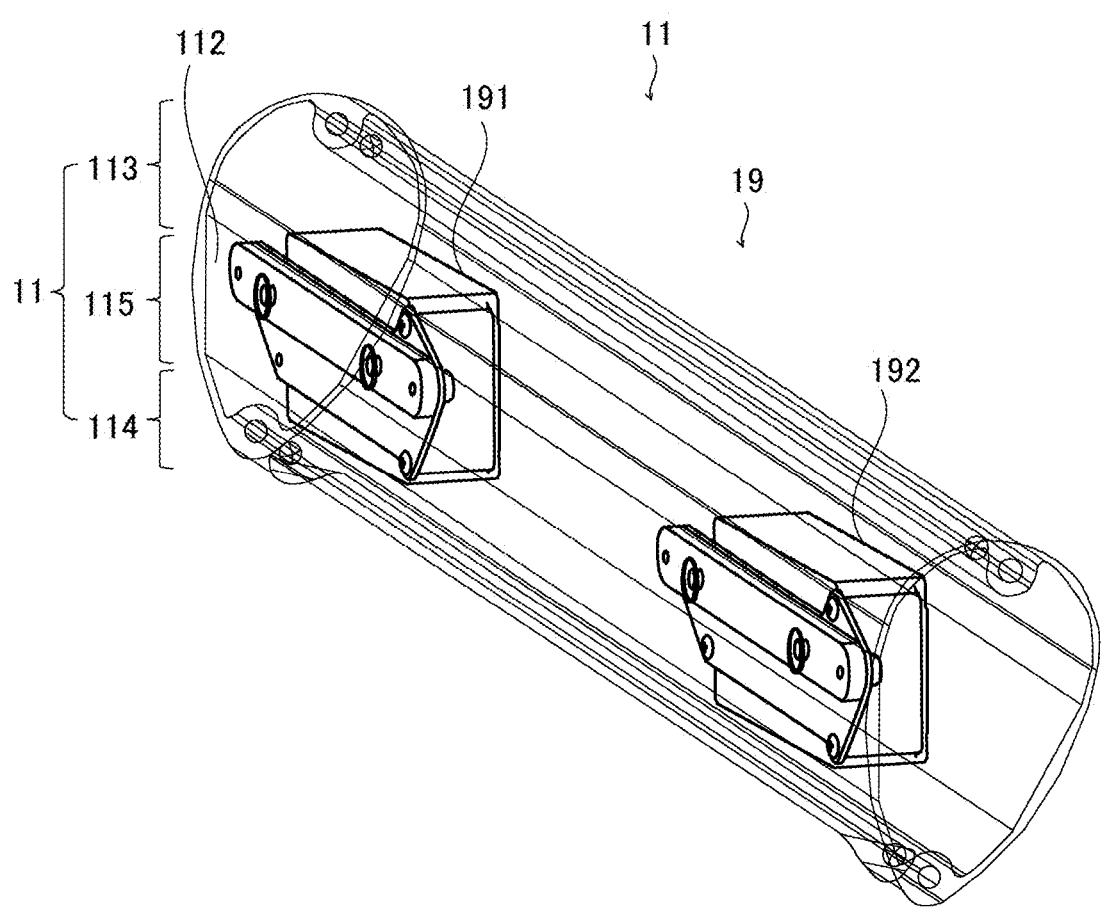
FIG. 8 is a transparent view showing the flying apparatus according to the embodiment of the present invention.
Figure 9:
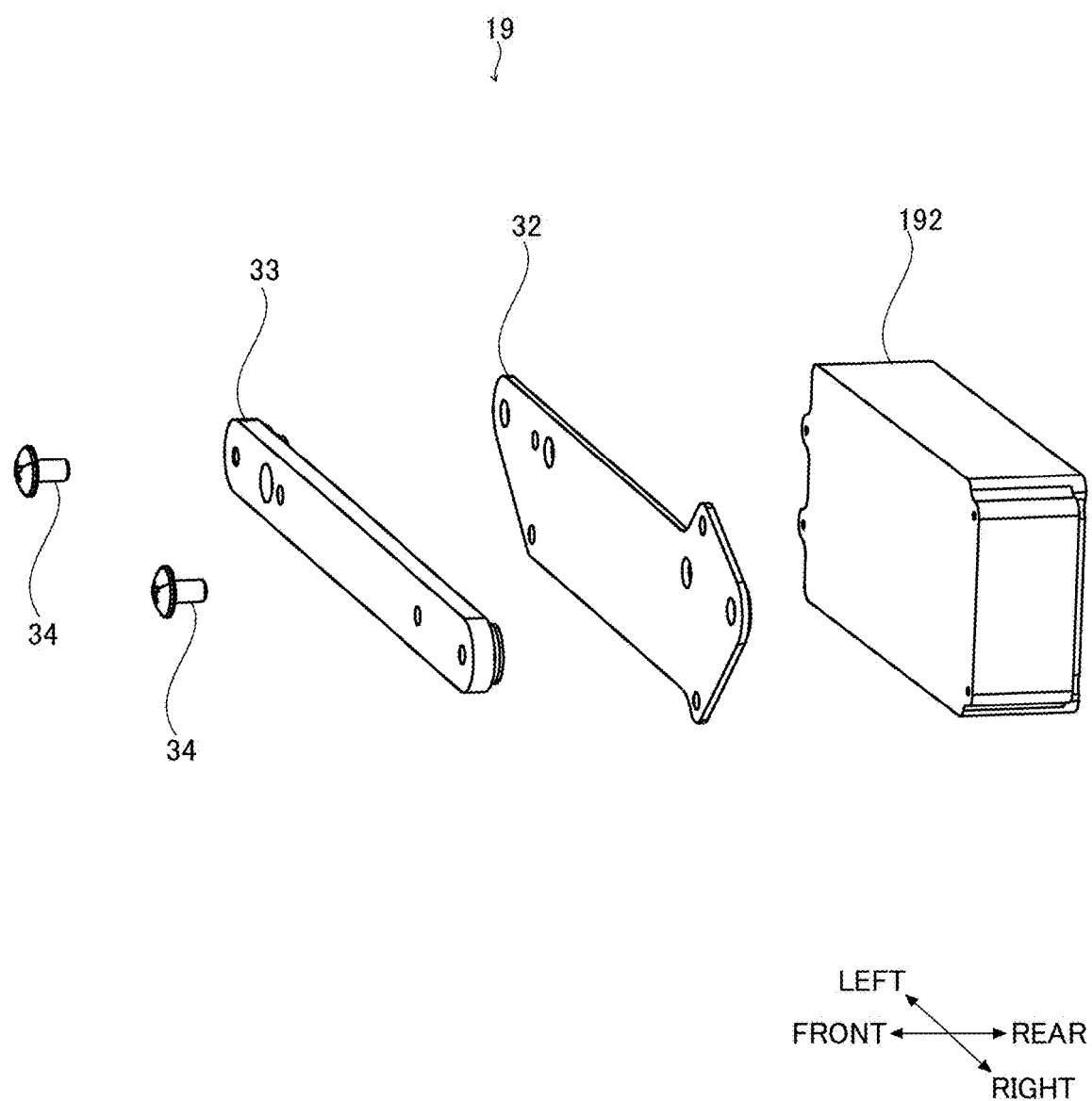
FIG. 9 is an exploded perspective view showing the flying apparatus according to the embodiment of the present invention.

With reference to FIG. 8 and FIG. 9, the configuration of the power converting unit 19 will be described in further detail. FIG. 8 is a perspective view showing the configuration in which the power converting unit 19 is disposed inside the arm 11 by seeing through the arm 11. FIG. 9 is an exploded perspective view showing the configuration in which the power converting unit 192 is attached to an inner wall of the arm 11.

With reference to FIG. 8, the power converting unit 192 and the power converting unit 191 are disposed inside the arm 11 as mentioned above.

With reference to FIG. 9, the power converting unit 192 is attached to the aforementioned flat surface 112 of the thick portion 115 of the arm 11 via an attachment plate 32 and an attachment plate 33.

In the power converting unit 192, an inverter circuit including a power semiconductor element which switches a large current at a high speed is incorporated in a box-shaped housing container made of a metal.

The attachment plate 32 is a plate-shaped member formed of a metal such as aluminum which comes into contact with the front surface of the power converting unit 192. The attachment plate 32 protrudes outward from the power converting unit 192 in the left and right direction. The attachment plate 32 is disposed on the front surface of the power converting unit 192 by using fastening means such as a screw.

The attachment plate 33 is a plate-shaped member formed of a metal such as aluminum which comes into contact with the front surface of the attachment plate 32. In addition, the front surface of the attachment plate 33 comes into contact with the flat surface 112 of the arm 11 shown in FIG. 8. The attachment plate 33 is configured to protrude outward from the power converting unit 192 in the left and right direction. In addition, the attachment plate 33 is fixed in contact with the front surface of the power converting unit 192 by fastening means, which is not shown here. Moreover, in the left and right direction, the two end portions of the attachment plate 33 are joined to the two end portions of the attachment plate 32 by fastening means such as screws. In addition, the attachment plate 33 is fastened to the thick portion 115 of the arm 11 shown in FIG. 8 via screws 34. That is, the screws 34 penetrate hole portions formed in the thick portion 115 and are fastened to fastening holes formed in the attachment plate 33.

With such a configuration, it is possible to attach the power converting unit 192 to the inside of the arm 11 via the attachment plate 32 and the attachment plate 33 and cause the attachment plate 32 and the attachment plate 33 to function as a heat sink. Hence, heat generated by the operation of the power converting unit 192 can be effectively dissipated via the attachment plate 32, the attachment plate 33, and the arm 11. Therefore, overheating of the power converting unit 192 during the flight of the flying apparatus 10 can be suppressed.

In addition, by using the attachment plate 32 and the attachment plate 33 for fixation of the power converting unit 192, the power converting unit 192 having a substantially cuboid shape can be fixed to the inner wall of the arm 11 having a substantially elliptic sectional shape.

Although the embodiments of the present invention have been described above, the present invention is not limited to these, and modification is possible without departing from the gist of the present invention. In addition, the aforementioned embodiments can be combined with each other.

For example, with reference to FIG. 1, the inside of the arm 11 can be used as a route through which wiring (harness) to be supplied to the motor 17 passes. Specifically, the wiring is laid out to pass through a hole portion formed in the airframe base 14, an inner opening of the cylindrical arm 11, the inside of the arm 11, and an outer opening of the arm 11. In this way, the inside of the arm 11 can be used as a wiring route. In addition, this wiring connects the aforementioned power converting unit 19.

REFERENCE SIGNS LIST 10 flying apparatus
11 arm
111 internal space
112 flat surface
113 upper thin portion
114 lower thin portion
115 thick portion
116 upper protruding portion
117 lower protruding portion
118 attachment hole
119 attachment hole
12 rotor
13 lid portion
121 upper rotor
122 lower rotor
13 attachment portion
14 airframe base
16 thinned portion
17 motor
171 upper motor
172 lower motor
18 sensor
19 power converting unit
191 power converting unit
192 power converting unit
20 engine
21 calculation control device
22 communication device
23 power generator
24 rotation range
25 battery unit
26 leg portion
27 output control device
28 housing unit
29 converter
30 heat sink
31 attachment portion
32 attachment plate
33 attachment plate
34 screw

The invention claimed is:

1. A flying apparatus comprising:
an airframe base;
a power supply unit;
an arm which extends from the airframe base toward a periphery;
a rotor which is disposed on an end portion side of the arm;
a motor which rotationally drives the rotor; and
a power converting unit which converts electric power supplied from the power supply unit to the motor, wherein
the power converting unit is included inside the arm below a rotation range of the rotor,
the arm has a substantially tubular shape which extends toward the periphery,
the power converting unit is in contact with an inner surface of the arm, and
a portion with which the power converting unit is in contact in the inner surface of the arm is a flat surface.

2. The flying apparatus according to claim 1, wherein
the arm includes an internal space which extends along an axial direction, and
the power converting unit is housed in the internal space.

3. The flying apparatus according to claim 1, wherein
the power supply unit includes a power generator which generates an alternating-current power, and
the power converting unit includes: a converter unit which converts the alternating-current power to a direct-current power; and an inverter unit which converts the direct-current power to the alternating-current power having a predetermined frequency.

4. The flying apparatus according to claim 1, wherein a portion of the arm with which the power converting unit is in contact is thicker than another portion of the arm.

5. The flying apparatus according to claim 1, wherein
the arm includes an upper thin portion, a lower thin portion, and a thick portion provided between the upper thin portion and the lower thin portion, and
the power converting unit is disposed to be in contact with an inner surface of the thick portion.

6. The flying apparatus according to claim 1, further comprising a lower protruding portion which is formed by causing a lower end side of the arm to continuously protrude upward.

7. The flying apparatus according to claim 1, further comprising an upper protruding portion which is formed by causing an upper end side of the arm to continuously protrude downward.

8. The flying apparatus according to claim 1, wherein
a distance between an outer end portion of the power converting unit and a portion in which the airframe base is connected to the arm is ⅔ or less of a length of the arm.

9. The flying apparatus according to claim 1, wherein
the rotor includes an upper rotor and a lower rotor,
the power converting unit includes a plurality of power converting units provided to correspond to the upper rotor and the lower rotor, and
all the power converting units are incorporated in the arm.

10. The flying apparatus according to claim 1, wherein
the power converting unit includes a plurality of power converting units disposed away from each other below the rotation range of the rotor.

11. The flying apparatus according to claim 1, wherein the arm is formed of an extruded or pultruded metal.

12. A flying apparatus comprising:
an airframe base;
a power supply unit;
an arm which extends from the airframe base toward a periphery and which has a substantially tubular shape;
a rotor which is disposed on an end portion side of the arm;
a motor which rotationally drives the rotor; and
a power converting unit which converts electric power supplied from the power supply unit to the motor, wherein
the power converting unit is included inside the arm below a rotation range of the rotor, the arm includes:

an upper thin portion which is an upper portion of the substantially tubular shape;

a lower thin portion which is a lower portion of the substantially tubular shape; and a thick portion which is provided between the upper thin portion and the lower thin portion, which is formed to be flatter than the upper thin portion and the lower thin portion, and which is thicker than the upper thin portion and the lower thin portion, and the power converting unit is disposed inside the arm to be in surface-contact with an inner surface of the thick portion.

13. A flying apparatus comprising:

an airframe base;

a power supply unit;

an arm which extends from the airframe base toward a periphery;

a rotor which is disposed on an end portion side of the arm;

a motor which rotationally drives the rotor; and a power converting unit which converts electric power supplied from the power supply unit to the motor, wherein the power converting unit is included inside the arm below a rotation range of the rotor, wherein the power supply unit includes a power generator which generates an alternating-current power, and the power converting unit includes: a converter unit which converts the alternating-current power to a direct-current power; and an inverter unit which converts the direct-current power to the alternating-current power having a predetermined frequency.

14. A flying apparatus comprising:

an airframe base;

a power supply unit;

an arm which extends from the airframe base toward a periphery;

a rotor which is disposed on an end portion side of the arm;

a motor which rotationally drives the rotor; and a power converting unit which converts electric power supplied from the power supply unit to the motor, wherein the power converting unit is included inside the arm below a rotation range of the rotor, wherein a portion of the arm with which the power converting unit is in contact is thicker than another portion of the arm.

15. A flying apparatus comprising:

an airframe base;

a power supply unit;

an arm which extends from the airframe base toward a periphery;

a rotor which is disposed on an end portion side of the arm;

a motor which rotationally drives the rotor; and a power converting unit which converts electric power supplied from the power supply unit to the motor, wherein the power converting unit is included inside the arm below a rotation range of the rotor, wherein the arm includes an upper thin portion, a lower thin portion, and a thick portion provided between the upper thin portion and the lower thin portion, and the power converting unit is disposed to be in contact with an inner surface of the thick portion.

16. A flying apparatus comprising:

an airframe base;

a power supply unit;

an arm which extends from the airframe base toward a periphery;

a rotor which is disposed on an end portion side of the arm;

a motor which rotationally drives the rotor; and a power converting unit which converts electric power supplied from the power supply unit to the motor, wherein the power converting unit is included inside the arm below a rotation range of the rotor, wherein a distance between an outer end portion of the power converting unit and a portion in which the airframe base is connected to the arm is ⅔ or less of a length of the arm.

17. A flying apparatus comprising:

an airframe base;

a power supply unit;

an arm which extends from the airframe base toward a periphery;

a rotor which is disposed on an end portion side of the arm;

a motor which rotationally drives the rotor; and a power converting unit which converts electric power supplied from the power supply unit to the motor, wherein the power converting unit is included inside the arm below a rotation range of the rotor, wherein the arm has a substantially tubular shape which extends toward the periphery, the power converting unit is in contact with an inner surface of the arm, and the power converting unit is disposed inside the arm to be in surface-contact with the inner surface of the arm.

* * * * *